Sept. 20, 1927.  
H. A. DENMIRE  
1,643,202  
APPARATUS FOR USE IN THE MANUFACTURE OF PNEUMATIC TIRES  
Filed Jan. 25, 1926   2 Sheets-Sheet 1
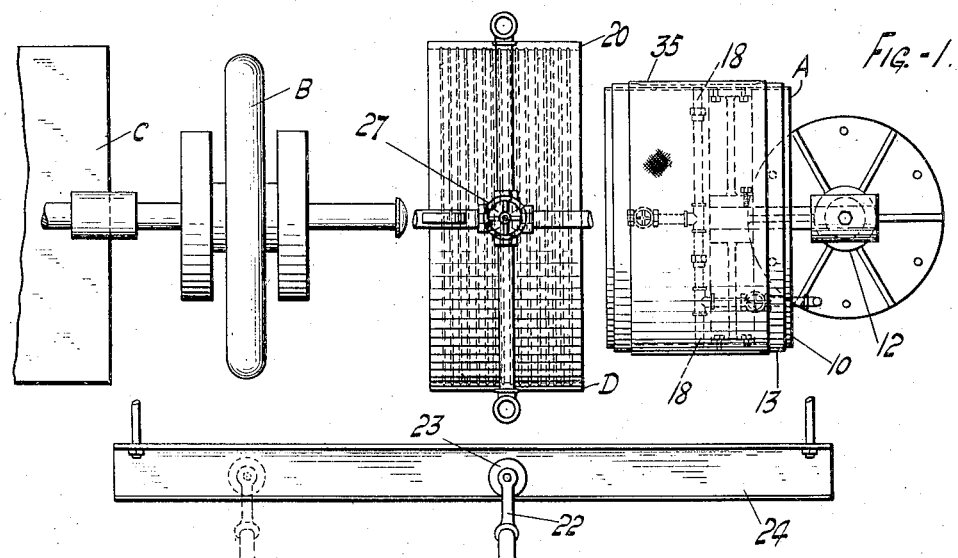
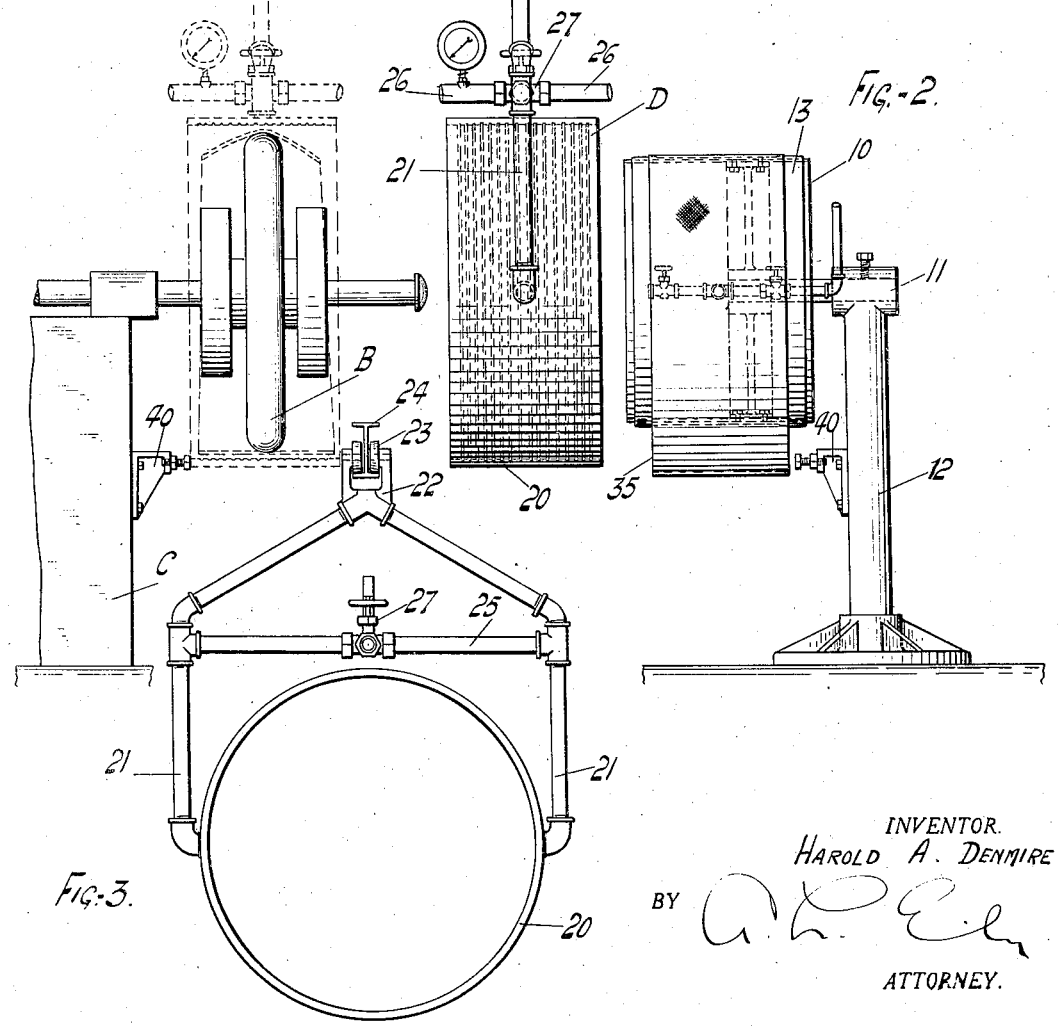
INVENTOR.
HAROLD A. DENMIRE
BY
ATTORNEY.

Sept. 20, 1927.  1,643,202
H. A. DENMIRE
APPARATUS FOR USE IN THE MANUFACTURE OF PNEUMATIC TIRES
Filed Jan. 25, 1926  2 Sheets-Sheet 2

INVENTOR.
HAROLD A. DENMIRE
BY
ATTORNEY.

Patented Sept. 20, 1927.

1,643,202

UNITED STATES PATENT OFFICE.

HAROLD A. DENMIRE, OF AKRON, OHIO, ASSIGNOR TO THE GENERAL TIRE AND RUBBER COMPANY, OF AKRON, OHIO, A CORPORATION OF OHIO.

APPARATUS FOR USE IN THE MANUFACTURE OF PNEUMATIC TIRES.

Application filed January 25, 1926. Serial No. 83,505.

The present invention relates to apparatus for use in the manufacture of automobile tires, particularly to apparatus to be used in the stretching of the fabric plies which compose the carcass of the tire, and the quick and accurate placing of the fabric about the core.

The apparatus herein shown and described is designed for the stretching of fabric bands, which are usually constructed from one or more plies of cord fabric, in conjunction with a drum or ring adapted to carry the band of fabric from the location where it is stretched to a position over the core. When the fabric band and the core are properly centered, the band is released and permitted to contract about the core.

The apparatus will be fully described in the following specification and the invention particularly pointed out in the claims, it being understood that the invention is not necessarily limited to exact conformity with the detailed showing herein made, but may be varied within the scope thereof as set forth in the claims.

In the drawings in which the preferred embodiment of the invention is shown:

Figure 1 is a plan view of the complete device;

Figure 2 is a side elevation;

Figure 3 is a detail view showing the transfer device;

The apparatus consists of a band expanding device A and a tire building core B which is carried by a tire building machine C. In combination with these elements is arranged a transfer device or drum indicated by the numeral D, this latter device being arranged to travel from a position surrounding the expander A where it picks up an expanded band of fabric, to a position surrounding the core B where the band of fabric is released and contracts of its own inherent elasticity about the core.

Figure 4:
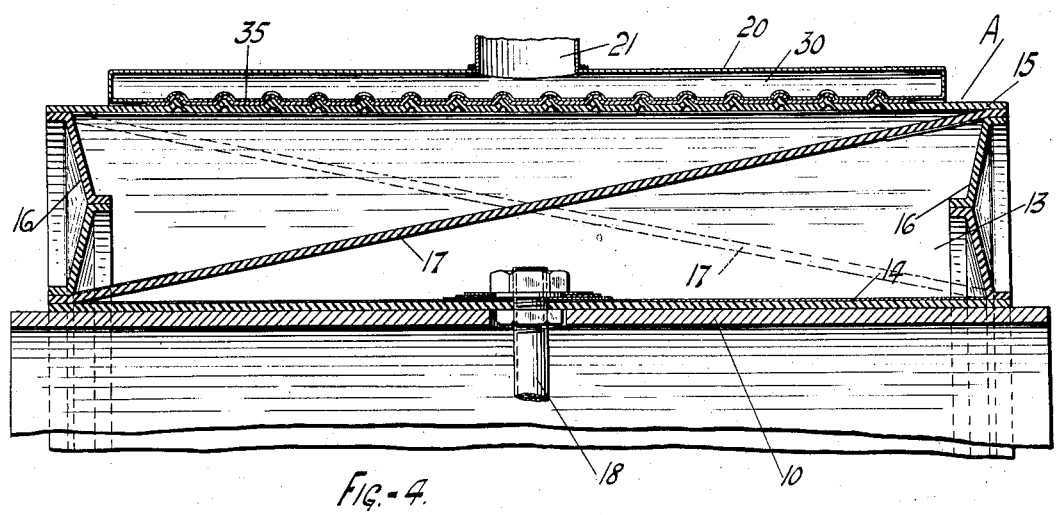
Figure 4 is an enlarged cross-section through the expanding mechanism showing the position of the transfer device with relation thereto.
Figure 5:
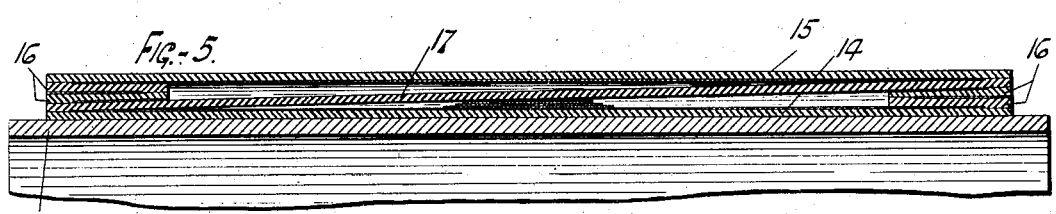
Figure 5 is a detail view of the expander in collapsed position.

The expander A comprises a drum 10 which is supported upon the end of a horizontal shaft 11 carried in the upper end of a stand 12. About the drum 10 is carried an expansible bag or casing 13 comprising inner and outer plies of sheet rubber 14 and 15 connected at the sides of the bag by bellows-like end walls 16. In order to prevent sidewise collapsing of the bag, a plurality of diagonal transverse tie pieces 17 are extended from the inner to the outer edges of the bag as shown in Figure 4. The bag is constructed in any well known manner from sheets of uncured rubber subsequently vulcanized. The bag is arranged to be expanded by air under pressure admitted through a valve 18.

The transfer device D is in the form of a cylinder or ring 20. The ring 20 is supported upon two depending hollow pipes 21 which constitute a frame work for the support of the ring, being secured within a bracket 22 which is provided with rollers 23 movable over an I-beam 24 which extends over the expander and over the core. The pipes 21 are cross connected by a hollow pipe 25, which is in turn connected by piping 26 with a pressure air tire and with a vacuum line, the connections being flexible to permit of movement of the transfer device. A suitable 4-way valve 27 controls the admission of air to the pipes 21, or the exertion of suction thereon.

Figure 6:
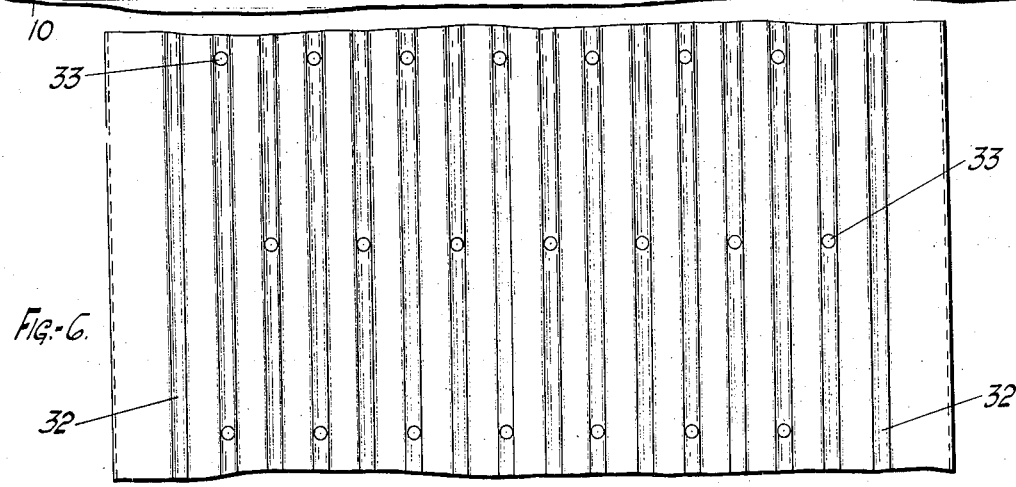
Figure 6 is a face view of a fragment of the transfer device.
Figure 7:
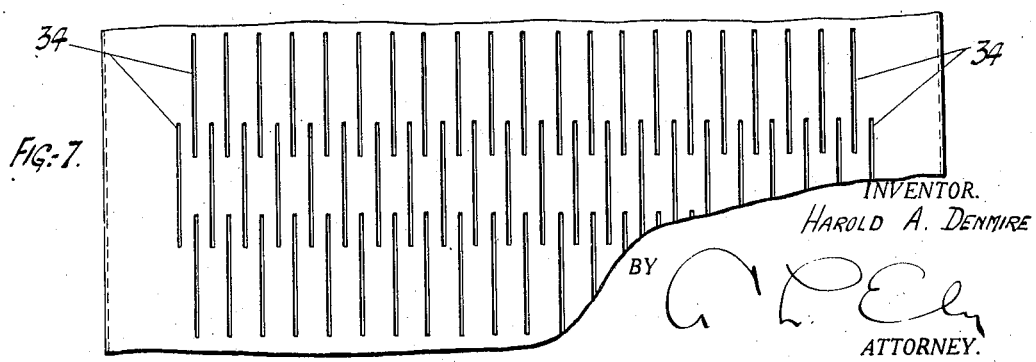
Figure 7 is a modified form thereof.

The pipes 21 communicate with an interior chamber 30 located in the ring 20, the inner face of the ring being provided with a plurality of ports. These ports are either in the form shown in Figure 6 or that shown in Figure 7. In Figure 6 the inner face of the drum is formed with a number of parallel channels 32 within which are provided a plurality of ports 33, arranged preferably in staggered relation. In Figure 7 the inner surface of the drum is formed with a plurality of narrow slits 34 which are also arranged in staggered relation.

In the operation of the device, a band of fabric 35 of the correct size, which is somewhat less in circumference than the outer periphery of the core, is hung over the expanding device, which is then in collapsed condition. The transfer device is then moved over the expander, which may have been expanded slightly to elevate the band sufficiently to permit the drum to pass over it. When the drum and the expander are properly registered, the air under pressure is turned on to its full extent and the bag 13 is expanded outwardly, stretching the band and passing it into close contact with the inner face of the transfer ring. The interior of the ring is now connected to the vacuum and the fabric band will be held tightly against the face of the ring. The bag is now contracted leaving the band supported by suction about its outer periphery upon the transfer drum.

The transfer drum is now moved to a position over the core and the vacuum is relieved, whereupon the band will contract about the core. The inherent contractile properties of the band will usually be sufficient to cause the band to leave the inner face of the transfer ring and snap over the core, but if this is not sufficient to insure a rapid movement of the band, the transfer ring may be connected to air under pressure through valve 27 which will blow the band of fabric off the ring.

The position of the transfer drum may be accurately determined by stop devices 40 arranged on the stand 12 and the tire machine C, these stop devices being adjustable, if preferred. The bands may be centered with respect to their center line or with respect to their edges adjacent the tire machine as may be found desirable. If the latter method is employed, it will be necessary to adjust the stops for the transfer device for the varying widths of the bands, depending upon their location on the tire.

The apparatus of the present invention constitutes a rapid labor saving device for the manufacture of pneumatic tires. The stretching of the band is done automatically and the amount of stretch will be evenly distributed throughout the band. The expansible bag insures an intimate contact over the entire inner face of the transfer drum. The band is placed accurately over the core and subsequent adjustment by the operator is unnecessary.

What is claimed is:

1. An apparatus for the manufacture of pneumatic tires comprising a drum, a fluid expansible bag about the drum, a transfer ring movable over the drum, and means to exert suction upon the inner face of the ring.

2. An apparatus for the manufacture of pneumatic tires comprising a drum and a core, a fluid expansible casing about the drum, a transfer ring movable from a position encircling the drum to a position encircling the core, and means to exert suction upon the inner face of the ring.

3. An apparatus for stretching bands for use in the manufacture of pneumatic tires and transferring the bands, comprising a drum and a ring movable into centering relation thereto, an expansible bag on the drum, and a source of suction communicating with the inner surface of the ring.

4. An apparatus for stretching bands for use in the manufacture of pneumatic tires and transferring the bands, comprising a drum and a ring, said elements being movable into centering relation with one another, an outer rubber covering about the drum, means to expand the covering into contact with the inner face of the ring, and a source of suction communicating with the inner surface of the ring.

5. An apparatus for stretching bands for use in the manufacture of pneumatic tires and transferring the bands, comprising a drum and a ring movable into centering relation with one another, a fluid expansible casing secured to the outer face of the drum, and means to exert suction upon the outer surface of a band when held in contact with the inner face of the ring by the expansion of the casing.

6. An apparatus for stretching bands for use in the manufacture of pneumatic tires and transferring the bands to a core, comprising a drum and a ring movable into centering relation with the drum or the core, and a fluid expansible casing secured to the outer face of the drum and adapted to stretch the band into contact with the inner face of the ring.

HAROLD A. DENMIRE.